May 27, 1969  M. S. DIETZ  3,446,128
EXPOSURE CONTROL APPARATUS FOR PHOTOGRAPHIC CAMERA
Filed Oct. 23, 1965
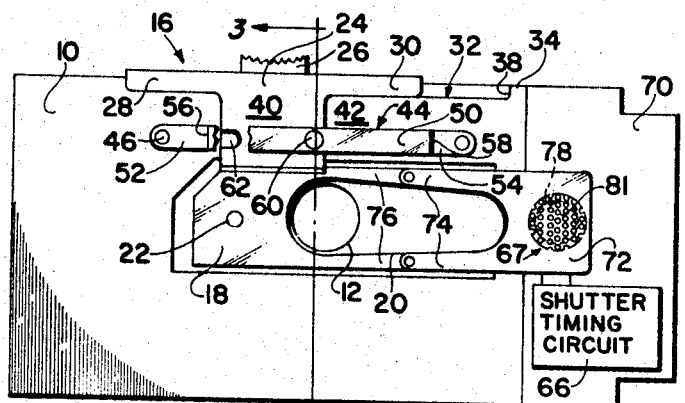
FIG. 1
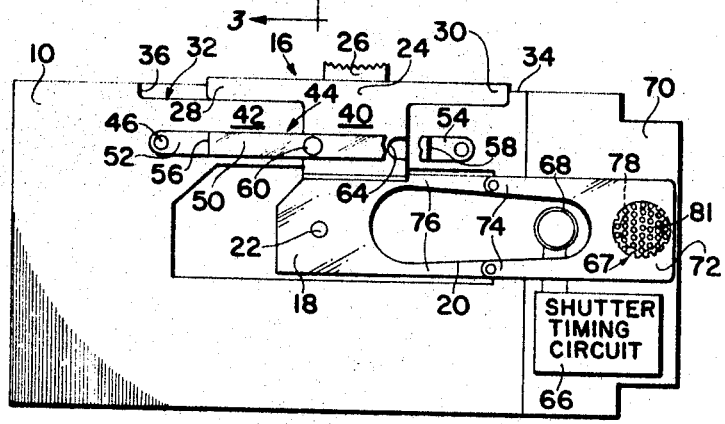
FIG. 2
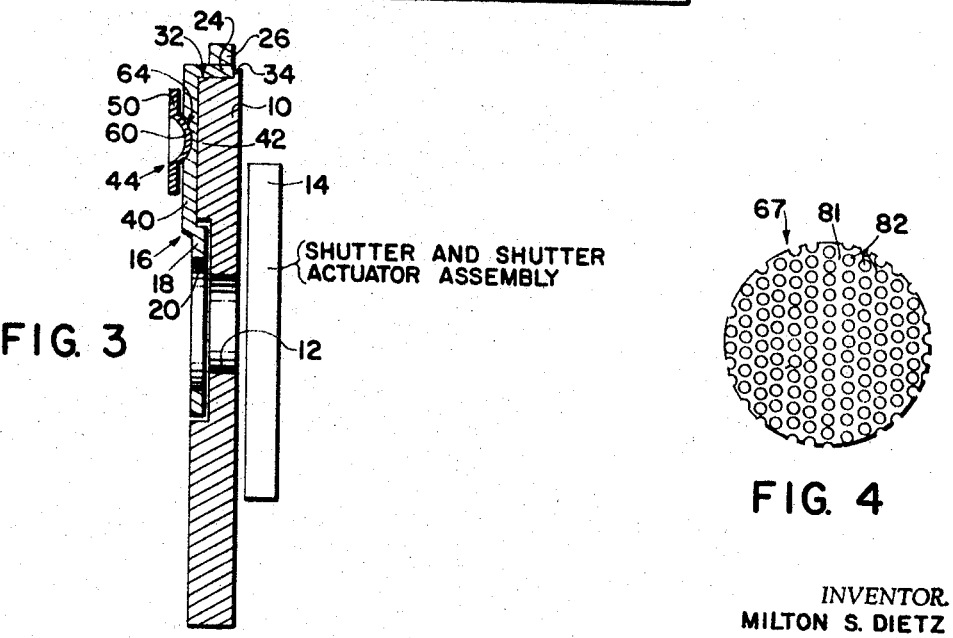
FIG. 3
FIG. 4
INVENTOR.
MILTON S. DIETZ
BY
BROWN and MIKULKA
ATTORNEYS United States Patent Office 3,446,128
Patented May 27, 1969

3,446,128
EXPOSURE CONTROL APPARATUS FOR
PHOTOGRAPHIC CAMERA
Milton S. Dietz, Lexington, Mass., assignor to Polaroid
Corporation, Cambridge, Mass., a corporation of
Delaware
Filed Oct. 23, 1965, Ser. No. 503,014
Int. Cl. G01j 1/04
U.S. Cl. 95—10                                                 4 Claims

ABSTRACT OF THE DISCLOSURE

Exposure control apparatus for adapting electronically timed shutters to use with films of a variety of speeds. The apparatus utilizes a unitary, multi-aperture diaphragm which is connected with a photocell mask. By manipulating the diaphragm from one aperture opening to another, the mask is connected to be moved over the photocell of a timing circuit.

---

This invention concerns a photographic camera having exposure control apparatus, and more particularly mechanical means in a camera with electronic shutter control for simultaneously adjusting the effective exposure aperture size and the exposure time effected by the shutter control apparatus. This invention is an improvement over an invention by John P. Burgarella described and claimed in application Ser. No. 503,667, filed on Oct. 23, 1965.

In a photographic camera capable of accommodating both color and black-and-white film having widely divergent film speed values, the exposure control apparatus must comprehend a very wide range of exposure values. The problem is particularly acute in the design of an inexpensive camera having automatic shutter control apparatus of the type wherein the timing circuit includes a photocell in an integrating circuit. Preferably, the shutter control apparatus should be such that the response time of the integrating circuit can be altered to cover a range of relatively long exposure times when the slower speed films are ultilized and, alternatively, to a different range of relatively short exposure times when faster speed films are used. Sophisticated, and correspondingly costly, timing circuitry can be employed to accomplish the shift in operating ranges of exposure times. However, in an inexpensive camera, such sophisticated circuitry would present burdensome costs.

Also, as films of widely divergent speeds are used in a camera, the effective exposure aperture size must be changed correspondingly. In a low-cost camera, this function also, of course, must be accomplished as inexpensively as possible.

Accordingly, it is an object of this invention to provide a photographic camera having inexpensive exposure control apparatus which enable film materials of widely divergent film speeds to be used in the camera.

It is another object of this invention to provide a photographic camera having exposure control apparatus by which the effective exposure aperture size can be adjusted and simultaneously, the operating range of the response times of electronic shutter control apparatus can be altered in order to effectuate use of the camera with film materials of widely divergent film speeds.

It is still another object of this invention to provide a photographic camera having exposure control apparatus which is highly effective and yet simple in structure and operation.

Briefly, applicant's exposure control apparatus may be embodied in a camera having electronic shutter control apparatus. The shutter control apparatus may include a timing circuit having a photocell comprising an element of an integrating circuit which governs the response time of the circuit. Using applicant's invention, in one embodiment thereof, a single linear movement of an operator will simultaneouly effect a change in the effective size of the exposure aperture and an adjustment in the operating range of exposure times of the shutter control apparatus. The novel exposure control apparatus may include an exposure adjustment member comprising a diaphragm plate having a plurality of openings of different areas therein, to which plate is integrally attached an operator reciprocable on a plate between first and second positions. Connected with the adjustment member is a mask support plate defining a mask aperture. A mask in the form of a perforated sheet is disposed over the mask aperture. In operation, if a film material having a slow speed is to be used, the exposure adjustment member is moved, by means of the operator, to a first position wherein the diaphragm plate provides a large effective exposure aperture size, and wherein the mask is positioned to cover the photocell. If a film having a fast film speed is utilized, the operator is moved to a second position wherein a smaller opening in the diaphragm plate defines the effective exposure aperture size, and wherein the mask is withdrawn to uncover the photocell and thereby to change the operating range of response times of the integrating circuit comprising a part of the shutter control apparatus.

Other objects of this invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein:

FIGURE 1 is a side view of applicant's exposure control apparatus for a photographic camera showing an exposure adjustment member in a first position;

FIG. 2 is another side view of applicant's exposure control apparatus, but showing the exposure adjustment member in a second position;

FIG. 3 is a section view taken on lines 3—3 in FIGURE 1; and

FIG. 4 is an enlarged view of a mask illustrated in FIGURES 1 and 2.

Referring to the figures of the drawing, one possible structural implementation of the invention will be seen. In this form, a mounting plate 10 is shown, having an exposure aperture 12 therein. On the back of the mounting plate 10 is mounted a shutter and shutter actuator assembly 14 (shown schematically in FIG. 2) by which unblocking and blocking of the exposure aperture is effected. A portion of a shutter blade comprising part of the shutter and shutter actuator assembly 14 can be seen in FIGURE 1 through the exposure aperture 12 in plate 10.

The dual function of changing the effective exposure aperture size and altering the effective operating range of exposure times of the electronic shutter control apparatus is accomplished with means including an exposure adjustment member 16. The exposure adjustment member 16 is slidably mounted to reciprocate on the mounting plate 10 between a first operating position, as shown in FIGURE 1, and second operating positions, shown in FIG. 2. The adjustment member 16 comprises a diaphragm plate 18 having therein an oblong opening 20 with a width greater than the diameter of exposure aperture 12 and a circular opening 22 with a diameter less than the diameter of exposure aperture 12.

An operator 24 formed integrally with the diaphragm plate 18 includes a button 26 and a pair of oppositely extending stabilizing wings 28, 30. The operator 24 slides in a depressed area 32 formed in the uppermost edge 34 of the mounting plate 10. The ends 36, 38 of the depressed area 32 act as stops, limiting the movement of the operator 24 to a definite length of travel and determining the first and second operating positions.

A channel section 40 of the exposure adjustment member 16 comprises an integral connection between the operator 24 and the diaphragm plate 18. As seen especially clearly in the section view (FIG. 3), the channel section 40 rides upon a generally rectangular, raised portion 42 of the mounting plate 10. This arrangement provides stability for the exposure adjustment member 16 in the vertical direction and serves as a linear guide for the member 16 as it is shifted from its first position at one end of the depressed area 32 (FIGURE 1) to its second position at the opposed end of depressed area 32 (FIG. 2).

In order to give lateral stability to the exposure adjustment member 16 as it rides upon the mounting plate 10, a leaf spring 44 is provided, the spring 44 being secured to the mounting plate 10 at points 46 and 48. To allow freedom of movement of the adjustment member 16, a central portion 50 of the leaf spring 44 is offset from end portions 52 and 54 by means of double bends in the spring 44 at 56 and 58.

To retain the adjustment member 16 in either of its first or second operating positions, a detent arrangement is provided, comprising a centrally disposed projection 60 extending inwardly from the spring 44 which cooperates with either one or the other of a pair of recesses 62, 64 formed on opposed sides of the channel member 40. It is evident that with this leaf spring and detent arrangement, a snap action is provided as the exposure adjustment member 16 is shifted from its first operating position to its second operating position.

The speed of the shutter comprising part of the shutter and shutter actuator assembly 14 is controlled electronically by means of a shutter timing circuit 66, shown schematically in FIGURES 1 and 2. One essential component of the shutter timing circuit 66 is a photocell 68, shown mounted upon a circuit board 70 attached to the mounting plate 10. The photocell 68 forms part of an integrating circuit which determines the response time of the timing circuit 66 and hence the exposure time effected by the shutter. When films having widely divergent film speeds are used, for example, black-and-white film having an ASA speed rating of 3000 and color film having an ASA speed rating of 75, an adjustment must be made in the operating range of exposure times of the shutter timing circuit 66. In expensive cameras such adjustments have been made electronically by changing the circuitry in the timing circuit. However, this solution to the problem is excessively costly in an inexpensive camera. By this invention applicant has provided a mechanical arrangement for adjusting the operating range of the shutter timing circuit 66. This mechanical arrangement is a mask 67 comprising a sheet which is moved in front of the photocell when the low speed film is used in order to increase the operating range of response times of the timing circuit 66.

Viewing FIGURES 1 and 2, a mask support plate 72 has a pair of legs 74 connected with a similar pair of legs 76 extending from the diaphragm plate 18. The mask support plate 72 defines a mask aperture 78 having a diameter larger than that of the window of photocell 68. The mask 67 is mounted over the mask aperture 78 and comprises a sheet 81 having a plurality of closely spaced circular apertures 82 (see FIG. 4). The apertures 82 admit light to the photocell 68; however, the interstices between the apertures 82 seem to shield a portion of the light incident on the mask 67 from the photocell 68.

In operation, when a film having a slow speed is to be used in a camera, the exposure adjustment member 16 is shifted to its first operating position (shown in FIGURE 1) wherein the oblong opening 20 in the diaphragm plate 18 completely uncovers the exposure aperture 12, and wherein the mask 67 overlies and partially shields the photocell 68. Thus, with slow speed film in the camera and the exposure adjustment member 16 set in its first position, not only is the effective exposure aperture set at its maximum area, but simultaneously the shutter timing circuit 66 is set to an operating range of relatively long response times. When the exposure adjustment member 16 is shifted to its second position (shown in FIG. 2) by means of operator 24, the circular opening 22 in the diaphragm plate 18 is moved on the optical axis and defines the effective exposure aperture size. In this position the photocell 68 is fully exposed to incident light through oblong opening 20 in diaphragm plate 18. In this second position then, with fast speed film in the camera, the incident light reaching the film is restricted by the small opening 22 and the operating range of the shutter timing circuit 66 is increased to cover a range of relatively short response times.

By this invention, then, applicant has provided inexpensive and simple exposure control apparatus by which the effective exposure aperture size and the operating range of response times of the shutter timing circuit can be simultaneously adjusted to accommodate film of widely divergent film speeds.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:
1. A photographic camera comprising:
a mounting plate having an exposure aperture therein for exposing photosensitive materials, said mounting plate have a raised guide portion thereon;
shutter means operably positioned relative to said exposure aperture for selectively uncovering and covering said aperture such that the amount of light admitted during exposure depends on the area of the exposure aperture and the duration during which said aperture is uncovered;
a photocell exposed to light from the scene to be photographed, said photocell having an electrical parameter which varies in dependence on the intensity of light incident thereon;
shutter control means including an electrical control circuit automatically responsive to said electrical parameter of said photocell for controlling the duration of the exposure by said shutter means,
an exposure adjustment member having first and second operating positions, said member providing for simultaneous selective adjustment of the size of the effective exposure aperture and the duration during which the effective exposure aperture is uncovered, comprising:
diaphragm means for varying the size of the effective exposure aperture between two different areas corresponding to the film speeds of different photosensitive materials,
a channel member received on said raised guide portion on said mounting plate for guiding said adjustment member along a reciprocatory path between said first and second positions,
mask means positioned over said photocell when said diaphragm means defines the greater one of said two effective exposure aperture areas for shielding a portion of the light incident on said mask means from said photocell and thus varying the effective operating times effected by said shutter control means, and
an operator providing means for manually moving said exposure adjustment member between said operating position.
2. A photographic camera comprising:
a mounting plate having an exposure aperture therein for exposing photosensitive materials, said mounting plate having a raised guide portion thereon;

shutter means operably positioned relative to said exposure aperture for selectively uncovering and covering said aperture such that the amount of light admitted during exposure depends on the area of the exposure aperture and the duration during which said aperture is uncovered;

a photocell exposed to light from the scene to be photographed, said photocell having an electrical parameter which varies in dependence on the intensity of light incident thereon;

shutter control means including an electrical control circuit automatically responsive to said electrical parameter of said photocell for controlling the duration of the exposure by said shutter means;

an exposure adjustment member having first and second operating positions, said member providing for simultaneous selective adjustment of the size of the effective exposure aperture and the duration during which the effective exposure aperture is uncovered, comprising:

diaphragm means for varying the size of the effective exposure aperture between two different areas corresponding to the film speeds of different photosensitive materials, a channel member received on said raised guide portion on said mounting plate for guiding said adjustment member along a reciprocatory path between said first and second positions, mask means positioned over said photocell when said diaphragm means defines the greater one of said two effective exposure aperture areas for shielding a portion of the light incident on said mask means from said photocell and thus varying the effective operating times effected by said shutter control means, and an operator providing means for manually moving said exposure adjustment member between said operating positions; and detent means for defining said first and second operating positions of said adjustment member and for retaining said adjustment member in the selected one of said operating positions.

3. A photographic camera comprising:

a mounting plate having an exposure aperture therein for exposing photosensitive materials, said mounting plate having a raised guide portion thereon, said mounting plate also having a depressed area on the uppermost edge thereof;

shutter means operably positioned relative to said exposure aperture for selectively uncovering and covering said aperture such that the amount of light admitted during exposure depends on the area of the exposure aperture and the duration during which said aperture is uncovered;

a photocell positioned in approximately the same plane as said exposure aperture and exposed to light from the scene to be photographed, said photocell having an electrical parameter which varies in dependence on the intensity of light incident thereon;

shutter control means including an electrical control circuit automatically responsive to said electrical parameter of said photocell for controlling the duration of the exposure by said shutter means;

an exposure adjustment member having first and second operating positions, said member providing for simultaneous adjustment of the size of the effective exposure aperture and the duration during which the effective exposure aperture is uncovered, comprising:

a diaphragm plate for varying the size of the effective exposure aperture between two different areas corresponding to the film speeds of different photosensitive materials, a channel member received on said guide portion of said mounting plate for guiding said adjustment member along a reciprocatory path between said first and second operating positions, mask means positioned over said photocell when said diaphragm means defines the greater one of said two effective exposure aperture areas for shielding a portion of the light incident on said mask means from said photocell and thus varying the effective operating times effected by said shutter control means, and an operator integral with said diaphragm plate providing means for manually moving said exposure adjustment member between said first and second operating positions, said operator traveling in said depressed area on said uppermost edge of said mounting plate, the ends of said depressed area serving as stops to define said first and second operating positions; and detent means for defining said first and second operating positions of said adjustment member and for retaining said adjustment member in the selected one of said operating positions.

4. The invention defined by claim 3 wherein said mask comprises a sheet having closely spaced, circular perforations therein.

References Cited

UNITED STATES PATENTS

| | | | |
|---|---|---|---|
| 3,027,818 | 4/1962 | Lee et al. | 95—10 |
| 3,276,339 | 10/1966 | Anwyl | 95—10 |
| 3,379,107 | 4/1968 | Lieser et al. | 95—10 |
| 2,080,055 | 5/1937 | Martin | 352—141 |
| 3,000,281 | 9/1961 | Rentscaler | 95—10 |

NORTON ANSHER, *Primary Examiner.*

R. A. SCHROEDER, *Assistant Examiner.*

U.S. Cl. X.R.

352—141